United States Patent [19]
Weaver, Jr. et al.

[11] Patent Number: 6,108,364
[45] Date of Patent: Aug. 22, 2000

[54] TIME DIVISION DUPLEX REPEATER FOR USE IN A CDMA SYSTEM

[75] Inventors: Lindsay A. Weaver, Jr., Boulder, Colo.; Franklin P. Antonio, Del Mar, Calif.; Richard F. Dean, Boulder, Colo.

[73] Assignee: Qualcomm Incorporated, San Diego, Calif.

[21] Appl. No.: 08/522,469

[22] Filed: Aug. 31, 1995

[51] Int. Cl.$^7$ .................................................. H04B 15/00
[52] U.S. Cl. ........................... 375/130; 370/492; 375/211
[58] Field of Search ..................... 370/280–282, 370/307; 375/200, 202, 206, 208, 211; 455/11.1, 18, 436–437, 442, 454

[56] References Cited

U.S. PATENT DOCUMENTS

| | | | |
|---|---|---|---|
| 4,901,307 | 2/1990 | Gilhousen et al. | 370/18 |
| 5,081,643 | 1/1992 | Schilling | 375/1 |
| 5,101,501 | 3/1992 | Gilhousen et al. | 455/33 |
| 5,109,390 | 4/1992 | Gilhousen et al. | 375/1 |
| 5,170,412 | 12/1992 | Massey | 375/1 |
| 5,184,347 | 2/1993 | Farwell et al. | 370/94.1 |
| 5,267,261 | 11/1993 | Blakeney, II et al. | 375/1 |
| 5,267,262 | 11/1993 | Wheatley, III | 375/1 |
| 5,278,892 | 1/1994 | Bolliger et al. | 379/60 |
| 5,295,153 | 3/1994 | Gudmundson | 375/1 |
| 5,305,308 | 4/1994 | English et al. | 370/32.1 |
| 5,416,797 | 5/1995 | Gilhousen et al. | 375/705 |
| 5,438,565 | 8/1995 | Hemmady et al. | 370/60 |
| 5,519,691 | 5/1996 | Darcie et al. | 370/18 |
| 5,590,173 | 12/1996 | Beasley | 379/58 |
| 5,592,481 | 1/1997 | Wiedeman et al. | 370/316 |
| 5,652,765 | 7/1997 | Adachi et al. | 375/211 |

FOREIGN PATENT DOCUMENTS

| | | | |
|---|---|---|---|
| 0409538 | 1/1991 | European Pat. Off. | H04K 3/00 |
| 0536068 | 4/1993 | European Pat. Off. | H04B 7/195 |

OTHER PUBLICATIONS

TIA Document entitled "Alternative methods for Inter--Channel Handoff" by Charles Wheatley of Qualcomm Incorporated, presented on Nov. 10–20, 1992 in Atlanta, Georgia, pp. 1–3.

TIA Document entitled "Proposed Draft Liaison Statement to TR45.2" by Edward G. Tiedemann, Jr. of Qualcomm Incorporated presented Dec. 3–11, 1992 in Phoenix, Arizona, pp. 1–43.

(List continued on next page.)

*Primary Examiner*—Stephen Chin
*Assistant Examiner*—Joseph Roundtree
*Attorney, Agent, or Firm*—Russell B. Miller; Linli L. Golden

[57] ABSTRACT

A method and apparatus for time division duplex (TDD) repeating a spread spectrum signal, where spread spectrum signal is comprised of a series of code symbol modulated with a pseudonoise (PN) sequence. The TDD repeater receives intermittently the spread spectrum signal at a location remote from a source supplying the spread spectrum signal. The TDD repeater amplifies and delays the received spread spectrum signal by a predetermined amount. The TDD repeater transmits intermittently the delayed amplified received spread spectrum signal such that the TDD is not receiving the spread spectrum signal when it is transmitting the signal energy.

37 Claims, 4 Drawing Sheets

OTHER PUBLICATIONS

TIA Document entitled "Intersystem Issues for Support of the Wideband Spread–Spectrum Digital Standard" by Gadi Karmi of Qualcomm Incorporated presented Oct. 6, 1992 in Boston, Massachusetts, pp. 1–7.

TIA Document entitled "CDMA Intersystem Operations" by Alejandro Holcman and Edward G. Tiedemann, Jr. of Qualcomm Incorporated, Presented at IEEE Conference on Vehicular Technology Committee in Stockholm, Sweden of Jun. 8, 1994.

TIA TR45.2 Intersystems Operations Presentation entitled "The Wideband Spread Spectrum Standard Under Development in TR45.5" by Edward G. Tiedemann of Qualcomm Incorporated, Presented in Atlanta, Georgia Nov. 16–20, 1992.

TIA Document entitled "Intersystem Operation With The Proposed Wideband Spread Spectrum Dual–Mode Mobile Station–Base Station Compatibility Standard" by Gadi Karmi and Frankli R. Quick of Qualcomm Incorporated, presented May 18, 1992 in Atlanta, Georgia, pp. 1–37.

TIA/EIA Telecommunications Systems Bulletin entitled "Cellular Radiotelecommunications Intersystem Operations: Authentication, Signaling Message Encryption and Voice Privacy", May 1993.

EIA/TIA Interim Standard Intersystem entitled "Cellular Radiotelecommunications Intersystem Operations: Handoff", Dec. 1991.

TIA/EIA Telecommunications Systems Bulletin entitled "IS–41–B Mobile Border System Problems", Apr. 1994.

TIA/EIA Telecommunications Systems Bulletin entitled "IS–41–B Support for Dual Mode Wideband Spread Spectrum Mobile Stations", Jan. 1994.

TIME DIVISION DUPLEX REPEATER FOR USE IN A CDMA SYSTEM

BACKGROUND OF THE INVENTION

I. Field of the Invention

This invention relates generally to spread spectrum communication systems and, more particularly, to an RF signal repeater.

II. Description of the Related Art

In a wireless telephone communication system, many users communicate over a wireless channel to connect to wireline telephone systems. Communication over the wireless channel can be one of a variety of multiple access techniques which facilitate a large number of users in a limited frequency spectrum. These multiple access techniques include time division multiple access (TDMA), frequency division multiple access (FDMA), and code division multiple access (CDMA). The CDMA technique has many advantages and an exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters or terrestrial base stations using CDMA spread spectrum communication signals. In using CDMA communications, the frequency spectrum can be reused multiple times thus permitting an increase in system user capacity.

The CDMA modulation techniques disclosed in the '307 patent offer many advantages over narrow band modulation techniques used in communication systems using satellite or terrestrial channels. The terrestrial channel poses special problems to any communication system particularly with respect to multipath signals. The use of CDMA techniques permits the special problems of the terrestrial channel to be overcome by mitigating the adverse effect of multipath, e.g. fading, while also exploiting the advantages thereof.

In a CDMA cellular telephone system, the same frequency band can be used for communication in all base stations. At the receiver, separable multipath, such as a line of site path and another one reflecting off of a building, can be diversity combined for enhanced modem performance. The CDMA waveform properties provide processing gain that is used to discriminate between signals that occupy the same frequency band. The high speed pseudonoise (PN) modulation allows many different propagation paths of the same signal to be separated, provided the difference in path delays exceeds the PN chip duration. If a PN chip rate of approximately 1 MHz is employed in a CDMA system, the full spread spectrum processing gain, equal to the ratio of the spread bandwidth to the system data rate, can be employed against paths having delays that differ by more than one microsecond. A one microsecond path delay differential corresponds to differential path distance of approximately 300 meters. The urban environment typically provides differential path delays in excess of one microsecond.

The multipath characteristic of a channel can result in signal fading. Fading is the result of the phasing characteristics of the multipath channel. A fade occurs when multipath vectors are added destructively, yielding a received signal that is smaller than either individual vector. For example, if a sine wave is transmitted through a multipath channel having two paths where the first path has an attenuation factor of $\chi$ dB, a time delay of $\delta$ with a phase shift of $\Theta$ radians, and the second path has an attenuation factor of $\chi$ dB, a time delay of $\delta$ with a phase shift of $\Theta+\pi$ radians, no signal would be received at the output of the channel.

The deleterious effects of fading can be further controlled to a certain extent in a CDMA system by controlling transmitter power. A system for base station and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM", issued Oct. 8, 1991, also assigned to the assignee of the present invention.

In the CDMA cellular system described in the above-referenced '307 patent, each base station provides coverage to a limited geographic area and links the mobile units in its coverage area through a cellular system switch to the public switched telephone network (PSTN). When a mobile unit moves to the coverage area of a new base station, the routing of that user's call is transferred to the new base station. The base station-to-mobile unit signal transmission path is referred to as the forward link and the mobile unit-to-base station signal transmission path is referred to as the reverse link.

As described above, the PN chip interval defines the minimum separation two paths must have in order to be combined. Before the distinct paths can be demodulated, the relative arrival times (or offsets) of the paths in the received signal must first be determined. A channel element modem performs this function by "searching" through a sequence of potential path offsets and measuring the energy received at each potential path offset. If the energy associated with a potential offset exceeds a certain threshold, a demodulation element may be assigned to that offset. After demodulating the signal present at that path offset can then be summed with the contributions of other demodulation elements at their respective offsets. A method and apparatus of demodulation element assignment based on searcher element energy levels is disclosed in co-pending U.S. patent application Ser. No. 08/144,902 entitled "DEMODULATION ELEMENT ASSIGNMENT IN A SYSTEM CAPABLE OF RECEIVING MULTIPLE SIGNALS," filed Oct. 28, 1993, assigned to the assignee of the present invention. Such a diversity or rake receiver provides for a robust digital link, because all paths have to fade together before the combined signal is significantly degraded.

In a cellular or personal communication telephone system, maximizing the capacity of the system in terms of the number of simultaneous telephone calls that can be handled is extremely important. System capacity in a spread spectrum system can be maximized if the transmit power of each mobile unit is controlled such that each transmitted signal arrives at the base station receiver at the same level. In an actual system, each mobile unit may transmit the minimum signal level that produces a signal-to-noise ratio that allows acceptable data recovery. If a signal transmitted by a mobile unit arrives at the base station receiver at a power level that is too low, the bit-error-rate may be too high to permit high quality communications due to interference from the other mobile units. On the other hand, if the mobile unit transmitted signal is at a power level that is too high when received at the base station, communication with this particular mobile unit is acceptable but this high power signal acts as interference to other mobile units. This interference may adversely affect communications with other mobile units.

Therefore to maximize capacity in an exemplary CDMA spread spectrum system, the transmit power of each mobile unit in communication with a base station is controlled by the base station to produce the same nominal received signal power at the base station. In the ideal case, the total signal power received at the base station is equal to the nominal power received from each mobile unit multiplied by the number of mobile units transmitting within the coverage area of the base station plus the power received at the base station from mobile units in the coverage areas of neighboring base stations.

The path loss in the radio channel can be characterized by two separate phenomena: average path loss and fading. The forward link, from the base station to the mobile unit, operates on a different frequency than the reverse link, from the mobile unit to the base station. However because the forward link and reverse link frequencies are within the same frequency band, a significant correlation exists between the average path loss of the two links. On the other hand, fading is an independent phenomenon for the forward link and reverse link and varies as a function of time. However, the characteristics of the fading on the channel are the same for both the forward and reverse link because the frequencies are within the same band. Therefore the average of fading over time for both links is typically the same.

In an exemplary CDMA system, each mobile unit estimates the path loss of the forward link based on the total power at the input to the mobile unit. The total power is the sum of the power from all base stations operating on the same frequency assignment as perceived by the mobile unit. From the estimate of the average forward link path loss, the mobile unit sets the transmit level of the reverse link signal.

Mobile unit transmit power is also controlled by one or more base stations. Each base station with which the mobile unit is in communication measures the received signal strength from the mobile unit. The measured signal strength is compared to a desired signal strength level for that particular mobile unit at that base station. A power adjustment command is generated by each base station and sent to the mobile unit on the forward link. In response to the base station power adjustment commands, the mobile unit increases or decreases the mobile unit transmit power by a predetermined amount.

Various methods exist for switching the mobile unit from one base station to another (known as "handoff"). One such method is termed a "soft" handoff, in which communication between the mobile unit and the end user is uninterrupted by the eventual handoff from an original base station to a subsequent base station. This method is considered a soft handoff in that communication with the subsequent base station is established before terminating communication with the original base station. When the mobile unit is communicating with two base stations, a single signal for the end user is created from the signals from each base station by a cellular or personal communication system controller. U.S. Pat. No. 5,267,261 which is incorporated by this reference and assigned to the assignee of the present invention, discloses a method and system for providing communication with the mobile unit through more than one base station during the handoff process, i.e., providing soft handoff.

When a mobile unit is in communication with more than one base station, power adjustment commands are provided from each base station. The mobile unit acts upon these multiple base station power adjustment commands to avoid transmit power levels that may adversely interfere with other mobile unit communications and yet provide sufficient power to support communication from the mobile unit to at least one of the base stations. This power control mechanism is accomplished by having the mobile unit increase its transmit signal level only if every base station with which the mobile unit is in communication requests an increase in power level. The mobile unit decreases its transmit signal level if any base station with which the mobile unit is in communication requests that the power be decreased. A system for base station and mobile unit power control is disclosed in U.S. Pat. No. 5,056,109 as noted above. Further information for a system of base station and mobile unit power control is disclosed in U.S. Pat. No. 5,265,199 entitled "METHOD AND APPARATUS FOR CONTROLLING TRANSMISSION POWER IN A CDMA CELLULAR MOBILE TELEPHONE SYSTEM", issued Nov. 23, 1993, also assigned to the assignee of the present invention.

Base station diversity at the mobile unit is an important consideration in the soft handoff process. The power control method described above operates optimally when the mobile unit communicates with each base station through which communication is possible. In doing so, the mobile unit avoids inadvertently interfering with communications through a base station receiving the mobile unit's signal at an excessive level but unable to communicate a power adjustment command to the mobile unit because communication is not established therewith.

It is also desirable to control the relative power used in each data signal transmitted by the base station in response to control information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB additional signal power from the active base station to achieve adequate performance.

At other times, the remote unit may be located where the signal-to-interference ratio is unusually good. In such a case, the base station could transmit the desired signal using a lower than normal transmitter power, reducing interference to other signals being transmitted by the system.

To achieve the above objectives, a signal-to-interference measurement capability can be provided within the mobile unit receiver. This measurement is performed by comparing the power of the desired signal to the total interference and noise power. If the measured ratio is less than a predetermined value, the mobile unit transmits a request to the base station for additional power on the forward link signal. If the ratio exceeds the predetermined value, the mobile unit transmits a request for power reduction. One method by which the remote unit receiver can monitor signal-to-interference ratios is by monitoring the frame error rate (FER) of the resulting signal.

The base station receives the power adjustment requests from each mobile unit and responds by adjusting the power allocated to the corresponding forward link signal by a predetermined amount. The adjustment would usually be small, typically on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

All the cellular radiotelephone systems operate by placing base stations throughout a geographic region such that each base station operates to provide communication with mobile units located within the limited geographic coverage area of the base station. With the initial deployment of the CDMA system, the CDMA system must work in areas currently covered by AMPS or TDMA systems where the two systems overlap. The AMPS and TDMA base station locations and corresponding coverage areas may be separate and distinct from the CDMA base stations and coverage areas. Likewise, within a particular technology system (AMPS, CDMA, or TDMA), there are generally two competing service providers within a given area typically referred to as the A and B carriers. These service providers often choose different base station locations from their competitor. In each of these situations, a mobile unit communicating using a first carrier or technology, might be far away from the base station with which it is in communication while being close to another base station with which it does not communicate. In such a situation, the desired receive signal is weak in the presence of strong multi-tone interference which can cause problems for a mobile unit.

The multi-tone interference encountered by the mobile unit from the narrow-band AMPS or TDMA signals can create distortion within the mobile unit. If the distortion products produce spurs that fall in the CDMA band used by the mobile unit, receiver and demodulator performance can be degraded.

Third-order distortion products occur when two tones are injected in a receiver. For example, if one tone at frequency $f_1$ at power level $P_1$ and a second tone at frequency $f_2$ at power level $P_2$ is injected into a receiver, third-order distortion products are created at frequencies $2xf_1-f_2$ and $2xf_2-f_1$ at power levels $P_{12}$ and $P_{21}$ respectively. For example within the cellular band, suppose that CDMA operation is designated from 880 MegaHertz (MHz) to 881.25 MHz. Also suppose that an AMP system operates to provide an FM signal at 881.5 MHz and a second FM signal at 882 MHz. Note that a spurious third order product occurs at $2\times881.5-882=881$ MHz which is directly within the CDMA band.

The power level of the created spurious third order product depends upon the power levels of the two signals which create it and the intermodulation performance of the mobile unit. The amount of distortion generated by the spurious third order product depends on the ratio of the total CDMA power to the total spurious third order product power. Two different means of limiting the distortion caused by the third order products are evident: limit the spurious third order products created by the mobile unit or increase the level of the CDMA signal in relation to the created third order products. Increasing the intermodulation performance of the mobile unit increases the price and power consumption of the mobile unit which is, of course, highly undesirable. A more elegant solution is to increase the CDMA signal level in proximity to the offending base stations.

One method of increasing the signal level of a signal in a given geographic region without providing additional signal generation means is to provide a repeater. A repeater is a device for receiving either one-way or two-way communications signals and delivering corresponding signals which are amplified, reshaped or both. A repeater is used to extend the length, topology or, interconnectivity of the physical medium beyond that imposed by a single segment. A repeater typically receives a signal created by a first usually distant communication unit and retransmits the signal to a second usually distant communication unit where the signal is processed.

One major problem with repeaters is that they tend to be unstable. A repeater can be unstable if it provides large gains to the repeated signal. If the transmitted signal feeds back into the receive portion of the repeater, the repeater can oscillate. If the repeater oscillates it ceases to provide the repeated signal and actually harms the system by providing spurious signals.

SUMMARY OF THE INVENTION

The present invention is a method and apparatus for providing a reliable repeater for use in a code division multiple access (CDMA) system. The present invention can provide high gain to the repeated signal without the risk of oscillation.

The present invention is a time division duplex (TDD) repeater for use in a CDMA system. In a CDMA system, high speed pseudonoise (PN) codes are used to modulate information symbols having a first symbol rate. At the CDMA receiver, the incoming signal is demodulated using the same high speed PN codes used to modulate the information signal at the base station. The demodulation process involves multiplying on a chip by chip basis the incoming signal with the series of PN chips in the high speed PN code. During each symbol, the energy is accumulated over the period of the symbol.

The repeater of the present invention provides a high gain to the RF signal while being immune from oscillation. The repeater operates by cascading a switch, a delay device (such as a standing acoustic wave (SAW) filter), and a series of amplifiers. The switch switches on and off at a rate higher than the symbol rate. The delay device provides a delay equal to approximately one half the duration of the switching period. The delay device acts as an analog storage device to store the signal for latter transmission. The amplifier amplifies the delayed signal output from the delay device. The switch is open and no signal is being received while the repeater is transmitting the delayed signal thus eliminating the need to provide a great amount of isolation between the transmit and receive antennas. Thus the repeater works in a time division duplex manner by periodically alternating transmission and reception.

At the receiver, the repeater's switched signal is demodulated in the usual manner. The signal to noise ratio is reduce by a factor of approximately 3 dB compared to the signal to noise ratio of a signal received at the same signal power which is received as a continuous signal of the same power level. But the signal is received at a much higher level than it would have been if the repeater had not been used.

Note that there is no need to synchronize the switching at the repeater to the PN codes or symbol boundaries. If it is necessary to cascade a series of such repeaters, the repeaters can be cascade without synchronizing the switching. To cascade two repeaters, the second repeater simply switches at higher or lower the rate of the first switch. Thus if the first TDD repeater operates at twenty times the symbol rate, the second TDD repeater may operate at ten times the symbol rate.

DESCRIPTION OF THE PREFERRED EMBODIMENT

Figure 1:
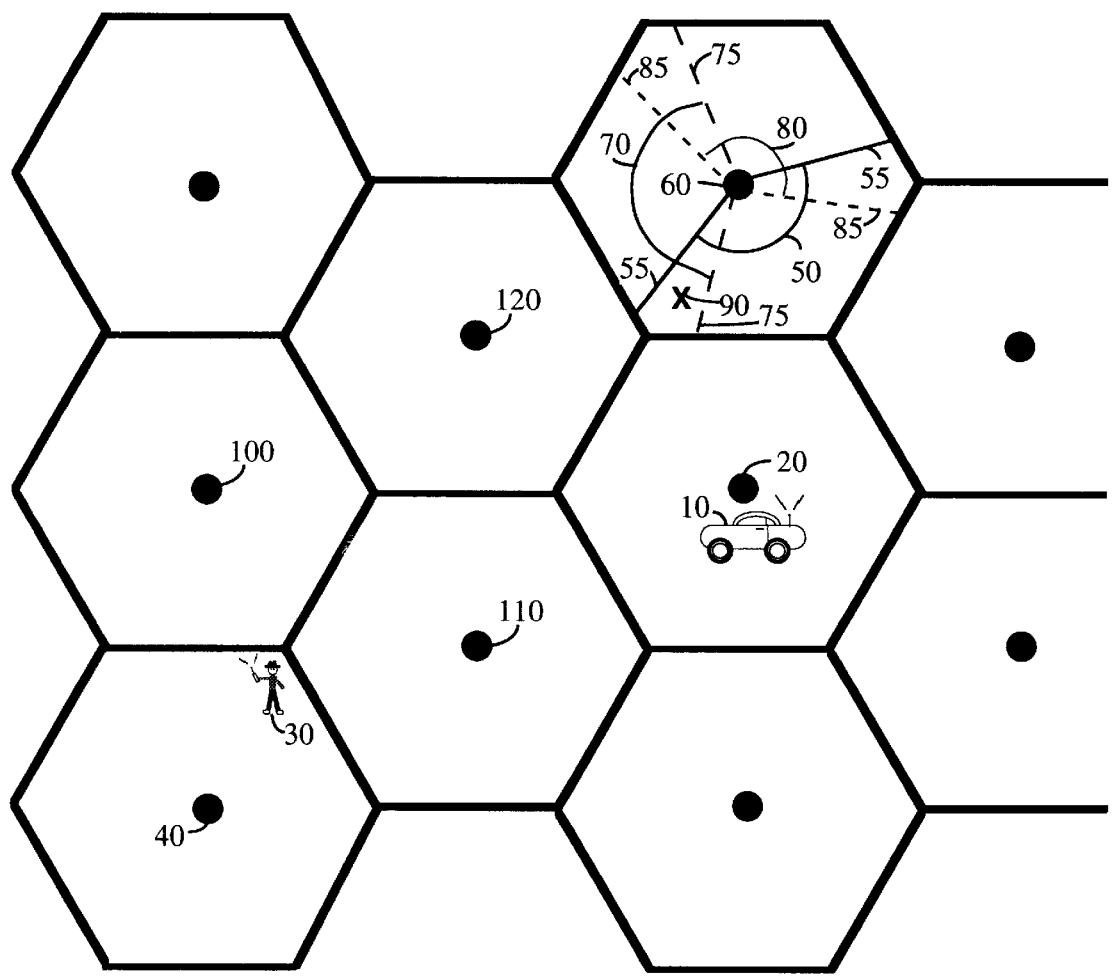
FIG. 1 represents an exemplary cellular coverage area structure.

FIG. 1 illustrates an exemplary base station coverage area structure. In such an exemplary structure, hexagonal base station coverage areas abut one another in a symmetrically tiled arrangement. Each mobile unit is located within the coverage area of one of the base stations. For example, mobile unit 10 is located within the coverage area of base station 20. In a code division multiple access (CDMA) cellular, wireless local loop, or personal communication telephone system, a common frequency band is used for communication with all base stations in a system thereby allowing simultaneous communication between a mobile unit and more than one base station. Mobile unit 10 is located very close to base station 20 and therefore receives a strong signal from base station 20 and relatively weak signals from surrounding base stations. However mobile unit 30 is located in the coverage area of base station 40 but is close to the coverage area of base stations 100 and 110. Mobile unit 30 receives a relatively weak signal from base station 40 and similarly sized signals from base stations 100 and 110. If each of base stations 40, 100, and 110 is capable of CDMA operation, mobile unit 30 might be in soft handoff with base stations 40, 100, and 110.

In this discussion the term "mobile unit" is used to refer generally to the remote subscriber station for the purposes of this description. Note, however, that the mobile unit may be fixed in location. The mobile unit may be part of a multiple user concentrated subscriber system. The mobile unit may be used to carry voice, data, or a combination of signal types. The term "mobile unit" is a term of art and is not meant to limit the scope or function of the unit.

Figure 2:
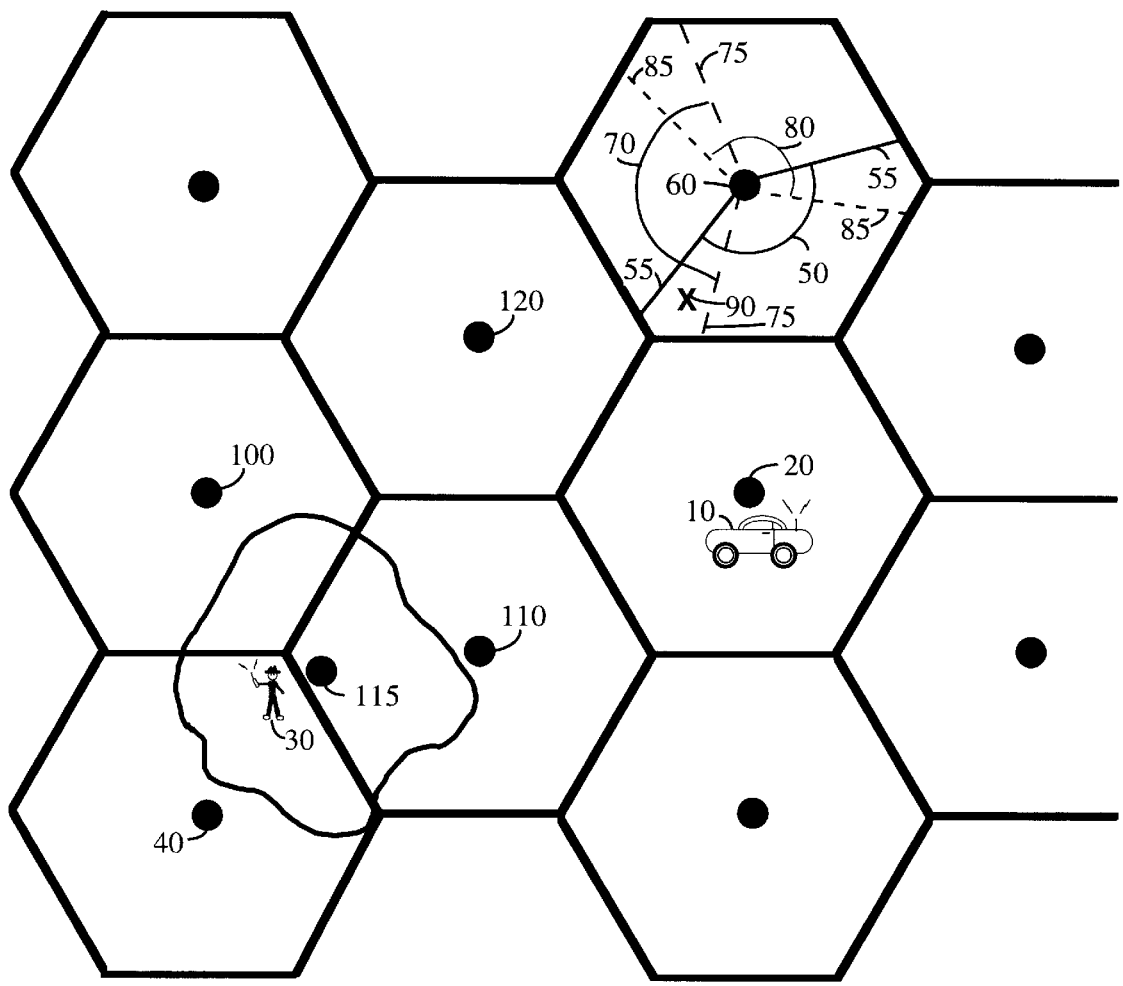
FIG. 2 represents an exemplary cellular coverage area structure including a base station operating in an alternative technology.

The exemplary base station coverage area structures illustrated in FIG. 1 and FIG. 2 are highly idealized. In the actual cellular or personal communication environment, base station coverage areas may vary in size and in shape. Base station coverage areas may tend to overlap with coverage area boundaries defining coverage area shapes different from the ideal hexagon shape. Furthermore, base stations may also be sectored such as into three sectors, as is well known in the art.

Base station 60 of FIG. 1 represents an idealized three sectored base station. Base station 60 has three sectors, each of which covers more than 120 degrees of the base station coverage area. Sector 50, having a coverage area indicated by the unbroken lines 55, overlaps the coverage area of sector 70, having a coverage area indicated by the coarse dashed lines 75. Sector 50 also overlaps the sector 80, having a coverage area as indicated by the fine dashed lines 85. For example, location 90 as indicated by the χ is located in both the coverage area of sector 50 and sector 70.

In general, a base station is sectorized to reduce the total interference power to and from mobile units located within the coverage area of the base station while increasing the number of mobile units that can communicate through the base station. For example, sector 80 would not transmit a signal intended for a mobile unit at location 90 and thus no mobile unit located in sector 80 is significantly interfered with by the communication of a mobile unit at location 90 with base station 60. For a mobile unit positioned at location 90, the total interference has contributions from sectors 50 and 70 and from base stations 20 and 120. A mobile unit at location 90 may simultaneously be in soft handoff with base stations 20 and 120 and sectors 50 and 70.

Although many uses are envisioned for the present invention, FIG. 2 represents one situation in which the present invention provides significant benefit. In FIG. 2, suppose that base stations 40, 100, and 110 provide communication signals using CDMA signals. Also suppose that a second carrier operates AMPS base stations in the same geographic area—for example, base station 115 having a realistically irregular coverage area as shown in FIG. 2. Note the signal conditions under which mobile unit 30 must operate. As noted above, mobile unit 30 receives a relatively weak signal from base station 40 and similarly sized signals from base stations 100 and 110. Mobile unit 30 is in very close proximity to base station 115 and therefore receives a significant amount of interference energy. Base stations 40, 100, and 110 provide communication signals using CDMA signals in a first frequency band and AMPS base station 115 provides signals in a neighboring band.

In real situations of this type, mobile unit 30 might be receiving a total CDMA energy level on the order of −80 dBm while simultaneously receiving 20 different AMP signals from base station 115 each having a power of −20 dBm thus totaling −7 dBm of interference power. The difference between the CDMA signal power of −80 dBm and the total AMP signal energy of −7 dBm is 73 dBm or a ratio of about 20 million to one. Even though the AMP signals are offset in frequency from the CDMA signals, a large amount of isolation is needed in order that the AMP signals not cause interference with the CDMA operation.

The most damaging effect in this situation is the effect of the intermodulation performance of the mobile unit. Typically the AMPS signals are narrow band FM signals spaced at 210 kHz apart in the frequency band adjacent to the CDMA operation band. In the exemplary embodiment, the CDMA signal is spread at a PN chip rate of 1.25 MHz resulting in a signal having a 1.25 MHz bandwidth. Thus, in this situation some of the intermodulation products created within the mobile unit are very likely to fall into the CDMA band with a significant signal level in comparison to the energy level of the CDMA signal.

Building a mobile unit which does not create intermodulation products at these high signal levels is impractical. Typically such high immunity intermodulation performance is not needed. For example, if base stations 40, 100, and 110 provide AMPS communication capabilities, the CDMA signal levels increase and decrease in the same manner as the AMPS signal levels as mobile unit moves toward and away from the base station thus the ratio of any intermodulation products to the CDMA signal level is not likely to be significant. Thus the high immunity intermodulation performance is only necessary in the case as shown with mobile unit 30 and base station 115 in FIG. 2. To increase the intermodulation performance of a mobile unit requires that the mobile unit provides a high degree of linearity in the presence of large RF signal levels in the first amplification stages of the receive chain where the undesired signals have not been filtered. However, linearity can only be provided in these stages at the cost of higher power consumption which adversely effects the battery life of the phone at all times to compensate for the relatively rare situation shown in FIG. 2.

Thus it is desirable to find a method of alleviating the degrading situation created in FIG. 2 without modifying the performance of the mobile unit significantly. One way to alleviate the situation in FIG. 2 is to increase the signal level of the CDMA signal in the region located in close proximity to base station 115. The carrier operating the CDMA system in most situations does not have access to the AMPS carrier's base station 115 making it difficult to co-locate an additional CDMA operation base station with base station 115.

One method of increasing signal level in a region without the addition of an entirely new base station is to use a signal repeater. A signal repeater is used to extend the coverage area or modify the topology beyond that of a single antenna. Repeaters perform basic signal processing such as restoration of signal amplitude, waveform shape or timing. In this case, the most basic repeater embodiment simply receives, amplifies and retransmits the signal. The repeater is typically installed in proximity to the area in which increased coverage is desired. For example, the repeater could be installed on a neighboring building to base station 115. The repeater has general use in coverage holes such as in the 'shadow' of a large building or in a freeway tunnel. Obviously, a highly desirable characteristic of a repeater is that it is easy to install and requires only a power connection to operate. One of the difficult design issues with a repeater which provides significant gain is to prevent positive feedback of the transmitted signal into the receive input of the repeater. If the transmit signal feeds back into the receive input of the repeater, the repeater can oscillate. Therefore a typical repeater must be carefully designed to provide a significant amount of isolation between the transmit and receive ports. If, as in the preferred embodiment of the present invention, the signals are transmitted and received as RF signals through antennas, the isolation is a large function of the placement of the transmit and receive antennas. The present invention avoids the problem of repeater oscillation and alleviates the need for careful installation of receive and transmit antennas.

The time divisions duplex (TDD) repeater of the present invention takes advantage of the pseudo-noise (PN) modulation used in the CDMA system by receiving the signal, delaying and thus storing the signal, and retransmitting the signal. The steps of transmitting and receiving are performed mutually exclusively such that the repeater is not receiving during those times in which it is transmitting.

In the exemplary embodiment of the present invention, a CDMA signal is created at a transmitting station, i.e. a base station or mobile unit, from a 9.6 kilobits per second (kbps) data stream. First the data bits are convolutionally encoded at rate ½ to produce a 19.2 kilosymbol per second (ksps) data stream. The 19.2 ksps data stream is block interleaved and scrambled by a long PN code mask running also at 19.2 ksps. The resultant 19.2 ksps scrambled data stream is further modulated with a Walsh function having a 1.2288 megachip per second (Mcps) rate. The 1.2288 Mcps Walsh modulated sequence is quadrature modulated by a pair of I and Q 1.2288 Mcps PN pilot sequences for transmission.

At a CDMA receiver, the incoming signal is demodulated using the same pair of I and Q 1.2288 Mcps PN pilot sequences and the same Walsh sequence used to modulate the information signal at the transmitter. The demodulation process involves multiplying on a chip by chip basis the incoming signal with same pair of I and Q 1.2288 Mcps PN pilot sequences and the same Walsh sequence. The despread data stream is then unscrambled using the same long PN code mask. The chip energies are accumulated over the period of a symbol to produce an aggregate symbol energy.

The present invention takes advantage of the energy accumulation over the duration of a symbol. Note that energy is accumulated over the entire duration of a symbol. Thus if the signal fades during only a portion of the symbol duration, very little energy is accumulated during the fade but sufficient energy can be accumulated during the remainder of the symbol duration to provide reliable decoding. The present invention takes advantage of the fact that the accumulation process does not require that the signal be continuously present in order to yield usable accumulation results.

In the exemplary embodiment of the present invention, the symbol rate is 19.2 ksps which is equivalent to a symbol duration of approximately 52 microseconds ($\mu$sec.) Thus in the preferred embodiment, the switching rate is on the order of 10 times faster than the symbol rate. As seen below the corresponding delay is ideally one half of the switching rate. For example, the preferred embodiment might have a 3 $\mu$sec. switching rate and a 1.5 $\mu$sec. delay. The major factor in choosing the switching rate is the symbol rate. The switching rate needs to be some what faster than the symbol rate so that entire symbols are not lost due to the switching process. However, several other factors influence the selection of the switching rate.

Another factor in choosing the switching rate is that the faster the switching rate, the higher the intermodulation products produced within the switched CDMA waveform. The CDMA waveform spectrum resembles band-limited white noise. When the CDMA waveform is modulated on and off, sidebands are created in the adjacent bands. In other words, the faster the switching rate, the higher the energy levels of the created sidebands.

Another consideration is the realizable delay values available. SAW filters can provide RF delay on the order of several hundred nanoseconds to tens of microseconds at the cellular frequencies. SAW filters are excellent to use in this type of application due to the fact that they provide delay with flat group delay meaning that all frequencies which pass through the SAW are delayed by approximately the same amount. Also the filtering effect of a SAW device can be used to filter out frequencies which need not be amplified by the repeater such as those frequencies corresponding to the AMPS transmission in the preferred embodiment.

Many different methods may be used to delay the signal. For example, the signal may be analog to digital converted, delayed by a digital delay element, and digital to analog converted. In such a case the amount of delay in the digital delay device could be varied over time thus freeing the TDD operation from a periodic switching mechanism for maximum efficiency. The delay could be tuned to match the duration of the current switching period.

Figure 3:
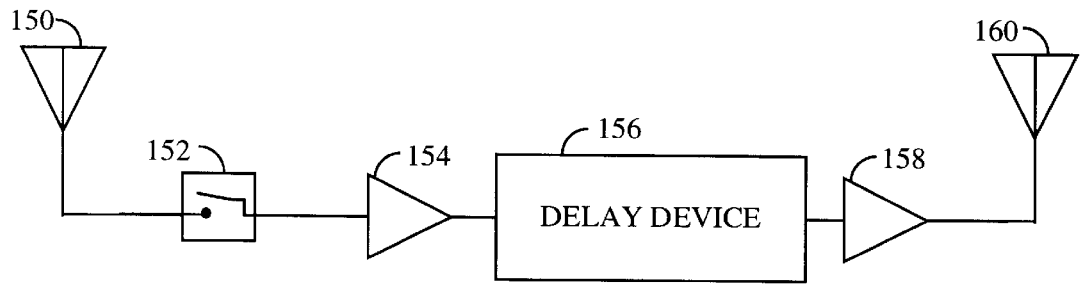
FIG. 3 is a block diagram representation of a TDD repeater according to the present invention.

FIG. 3 shows a simple block diagram of the present invention. Antenna 150 receives the RF signal. Switch 152 passes the signal when closed and blocks the signal when open. Amplifier 154 provides amplification to the switched signal. Typically SAW filters cause a large amount of attenuation to the signals which they pass. The switching operation itself inherently decreases the signal to noise ratio of the resulting signal. It is important however to limit the amount of degradation caused by the repeater. By inserting some amount of amplification before the SAW filter and raising the signal levels far above the noise floor, the effects of the attenuation loss on the signal to noise ratio can be minimized. In some cases it may be advantageous to add delay even in front of switch 152. Delay device 156 provides a delay on the order of one half of the switching period of switch 152. As noted above, the delay device operates to store the received signal for later transmission. Amplifier 158 amplifies the delayed and switched output of delay device 156 for transmission by antenna 160.

Figure 5:
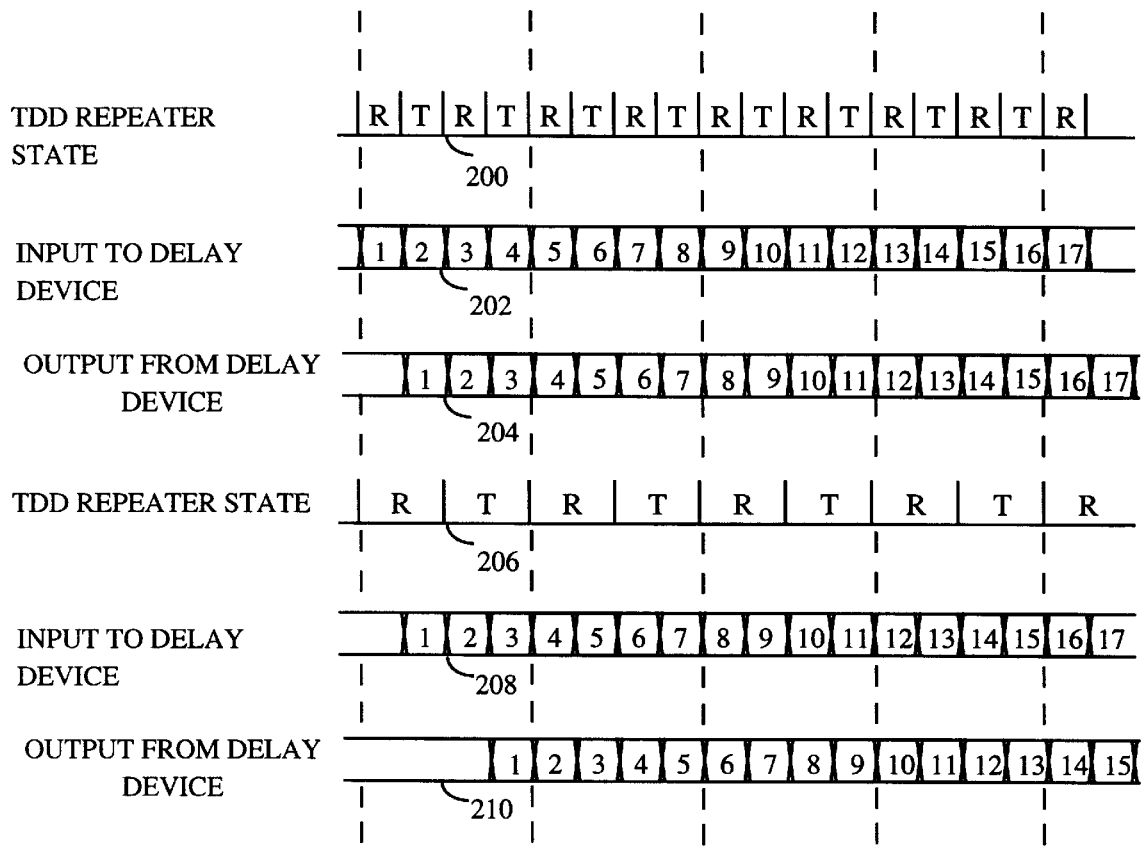
FIG. 5 is a timing diagram illustrating the TDD operation.

FIG. 5 shows in time the operation of the TDD repeater. Time line 200 shows the state of the TDD repeater—either transmitting or receiving. Theoretically, the operation of the TDD repeater could have precisely a 50% duty cycle as shown in time line 200. For practical reasons including variation in the exact delay time of the delay device, the duty cycle ration of transmission time to total time may be somewhat less than 50%. Time line 202 shows the received signal illustratively divided into time segments each having a length equal to the delay induced by the delay device. The time segments are numerically labeled and time line 204 shows the corresponding output of the delay device. Note that the switch which couples the delay device to the antenna is only closed during the receive process. Therefore only those segments which are labeled with odd numbers actually contain data signals. Likewise, note that at the output of the delay device only those time segments corresponding to odd numbers are aligned with the transmission indications on time line 200. Thus only those time segments corresponding to odd numbers are transmitted by the TDD repeater. The signal energy corresponding to the even time segments is lost due to the TDD nature of the repeater.

In the illustrative embodiment detailed herein, the TDD repeater is used to repeat signals for use in a mobile communication environment. In the mobile communication environment, communication is bi-directional between a base station and a mobile unit. In the exemplary CDMA system detailed above, each mobile unit estimates the path loss of the forward link based on the total power at the input to the mobile unit. From the estimate of the average forward link path loss, the mobile unit sets the transmit level of the reverse link signal. Thus the power transmitted by the mobile unit is proportional to the power received by the mobile unit. Therefore if a repeater is to be used in this type of a cellular system, it must operate bi-directionally with balanced gain. That is to say that the repeater must repeat the forward link signal and the reverse link signal and that the gain the repeater inserts in the forward link including the effect of the switching, it must also insert in the reverse link lest the power control mechanism become imbalanced.

Figure 4:
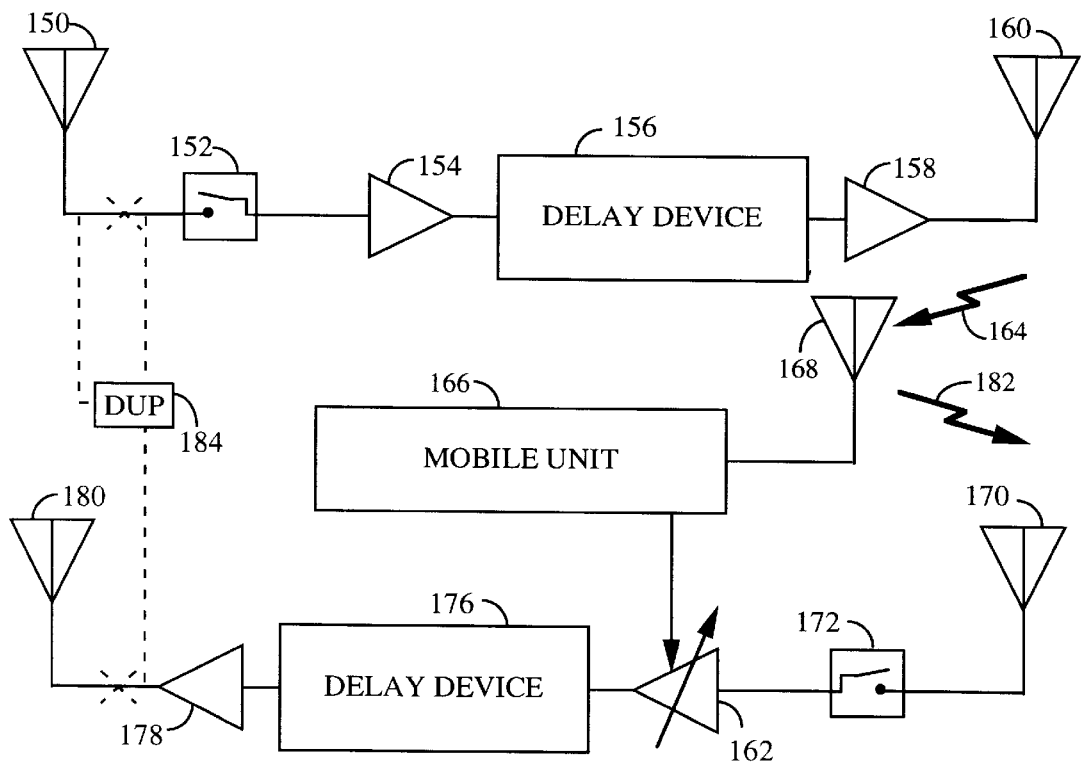
FIG. 4 is a block diagram representation of a bidirectional TDD repeater comprising gain balancing circuitry.

FIG. 4 illustrates a repeater having bi-direction operation. In FIG. 4 the forward link frequencies are received through antenna 150 and transmitted by antenna 160. The reverse link signal from the mobile units to the base station are received on antenna 170, switched by switch 172, delayed by delay device 176, amplified by amplifiers 162 and 178, and transmitted by antenna 180. Note that if delay device 176 is implemented using a SAW filter, it should be tuned to the reverse link frequency band while delay device 156 should be tuned to the forward link frequency band. There is no need to synchronize the switching of the forward and reverse link sections of the repeater so long as there is sufficient frequency isolation within the repeater such that transmission in one direction does not cause oscillation during reception in the opposite direction. It is not even necessary that the two directions use the same switching frequency.

As noted above, for power control to operate optimally, the repeater must be balanced to produce the same gain on both the forward and reverse links. The repeater is typically deployed in an outdoor environment where it is subjected to a wide variety of environmental changes such as temperature which may cause a repeater which was initially in balance to become out of balance. Therefore it may be advantageous to include within the repeater a mechanism for automatically adjusting the relative gain of the reverse link with respect to the gain on the forward link.

During normal operation in the exemplary CDMA system, in addition to the so called "open loop" power control performed by the mobile unit as it bases its transmit power on the receive power it perceives, each mobile unit's transmit power is also controlled by one or more base stations in a closed loop operation. Each base station with which the mobile unit is in communication measures the received signal strength from the mobile unit. The measured signal strength is compared to a desired signal strength level for that particular mobile unit at that base station. A power adjustment command is generated by each base station and sent to the mobile unit on the forward link. In response to the base station power adjustment commands, the mobile unit integrates the power adjustment commands to create a gain control signal typically referred to as a transmit gain adjustment signal. The mobile unit increases or decreases its transmit power by a predetermined amount based on the value of the transmit gain adjustment signal. Note that the transmit gain adjustment signal is indicative of the balance between the forward and reverse link signals at the site at which the mobile unit is located.

The transmit gain adjustment signal can be used to maintain balance within a TDD repeater of the present invention. FIG. 4 shows one such embodiment in which mobile unit 166 is included as part of the TDD repeater. Either continually or intermittently, mobile unit 166 participates in an active call with the base stations whose signals it is repeating. Mobile unit 166 receives on antenna 168 repeated forward link signal 164 from antenna 160 and transmits reverse link signal 182 on antenna 168 to antenna 170. Mobile unit 166 bases the power level of reverse link signal 182 on the level of repeated forward link signal 164 including the effects of switching.

Just like every other mobile unit in the system, mobile unit 166 uses both open and closed loop power control as described in the above mentioned U.S. Pat. Nos. 5,056,109 and 5,265,199 and as described in EIA/TIA/IS-95 document entitled "Mobile Station—Base Station Compatibility Standard for Dual-Mode Wideband Spread Spectrum Cellular System." Mobile unit 166 bases the power level of its transmit signal on power control adjustment commands received from the base station by creation of the transmit gain adjust signal. If the two links are balanced, the value of transmit gain adjust indicates that very little adjustment is needed to the open loop estimation and the transmit gain adjust value is fairly small.

If the two links become imbalanced, the transmit gain adjust signal begins to indicate the degree and polarity of the imbalance. If the forward link has more gain than the reverse link, the transmit gain adjust signal indicates that the mobile unit needs to increase it's reverse link signal. If the forward link has less gain than the reverse link, then the transmit gain adjust signal indicates that the mobile unit needs to decrease it's reverse link signal. Note that the value of the transmit gain adjust signal is directly proportional to the degree of imbalance between the forward and reverse link repeater performance. Thus the performance of the TDD repeater can be balanced by use to the transmit gain adjust signal. FIG. 4 shows one such implementation. The bi-directional TDD repeater has been calibrated with mobile unit 166 including the relative positioning of antennas 160, 168, and 170 such that when the value of transmit gain adjust signal is applied to variable amplifier 162, the two links are balanced.

There are many variations to the configuration in FIG. 4 such as antenna 150 and antenna 180 might be the same antenna with optional duplexer 184 used to couple energy at the receive frequencies to switch 152 and at the transmit frequencies from amplifier 178. Likewise antenna 160 and antenna 170 might also be the same antenna. Antenna 150 and antenna 180 may be highly directional antennas directed toward the source of the forward link signal and the destination of the reverse link signal respectively. The directivity of the antenna can be used to prevent the TDD repeater from amplifying unwanted signals from other base stations. In some cases it may be possible to implement the apparatus of FIG. 4 using a single antenna.

It also may be advantageous to have some distance between the antenna coupled to the base station and the antenna coupled to the mobile units. For example if the repeater is used to raise the signal level in a region blocked from the signal source by a large obstacle, the antenna coupled with the base station may be positioned on the same side of the obstacle as the base station while the antenna coupled to the mobile units may be positioned on the far side of the obstacle where the coverage area hole is located.

Figure 6:
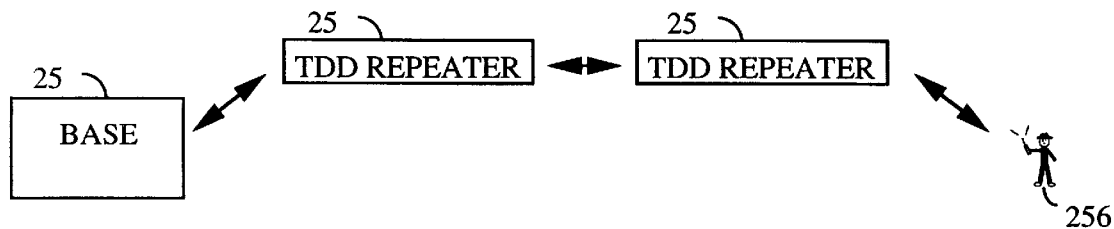
FIG. 6 shows a cascaded repeater configuration.

The TDD repeater of the present invention may be easily cascaded. For example if one TDD repeater is used to amplify a signal in a tunnel environment and a second repeater is required to extend the range, a second TDD repeater may receive and amplify the signal from the first repeater and may provide a signal to be received and amplified by the first repeater. For example, FIG. 6 shows a cascaded repeater configuration. TDD repeater 252 receives signals from base station 250 and retransmits them to TDD repeater 254. TDD repeater 254 retransmits the signal to mobile unit 256. Likewise, TDD repeater 254 receives a signal from mobile unit 256 and retransmits it to TDD repeater 252. TDD repeater 252 retransmits the signal to base station 250. If the same switching frequency were used, the two cascaded repeaters would have to be synchronized taking into account any delay effects between the two units. The synchronization process would be difficult and would have to be operated in a time locked fashion to take into account timing drifts.

However, synchronization is not required to cascade the two TDD repeaters. To cascade two repeaters, the second repeater simply switches at a higher or lower rate of the first switch. For example, if the first TDD repeater operates at twenty times the symbol rate, the second TDD repeater may operate at ten times the symbol rate. The output of the second cascaded repeater is a subset of the output of the first cascaded repeater. As explained above in the example of FIG. 5 only the odd number time segments are transmitted from the first repeater. A second cascaded repeater would transmit only half the energy of the odd numbered time segments. There is no need to synchronize the switching edges of the two cascaded repeaters. Again the forward and reverse links need not be synchronized or even operate at the same switching frequency. The two cascaded sections result in a signal that is degraded by at least 6 dB compared to the signal to noise ratio of a signal received at the same signal power which is received as a continuous signal of the same power level.

FIG. 5 also shows in time the operation of a second cascade TDD repeater operating at a switching rate of one half the first TDD repeater. Time line 206 shows the state of the second TDD repeater—either transmitting or receiving. As noted above, the timing of the first and second repeaters need not be aligned to one another. For ease of illustration, the timing of the two TDD repeaters is synchronized and the transmission path delay between the first and the second repeater is assumed to be negligible. Time line 208 shows the received signal of the second receiver illustratively divided into time segments each having a length equal to the delay induced by the delay device of the first repeater and aligned with reference to the output of the first TDD delay device. Time line 210 shows the corresponding output of the delay device. The delay device in the second TDD repeater is twice that of the delay of the first TDD repeater. Note that only those segments which are labeled with odd numbers actually contain data signals due to the TDD nature of the first repeater. Likewise, note that at the output of the delay device only those time segments corresponding to every other odd number (i.e., 1, 5, 9, 13, 17) are aligned with the transmission indications on time line 206. The signal energy corresponding to the remaining odd time segments (i.e., 3, 7, 11, 15) is lost due to the TDD nature of the second repeater.

The preferred embodiment is disclosed with reference to a PN spread spectrum system. Obviously the present invention may be used in other systems such frequency hopped systems. The TDD repeater in a frequency hopped system may be configured such that the delay of the TDD repeater is equal to the frequency dwelling duration at each frequency. Thus every other frequency's energy is repeated by the TDD repeater.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of amplifying a spread spectrum signal at a repeater site, said spread spectrum signal comprised of a series of code symbols, said method comprising the steps of:

receiving during a first interval said spread spectrum signal;

amplifying said received spread spectrum signal;

delaying with a delay circuit said amplified received spread spectrum signal by a predetermined amount;

transmitting from an antenna during a second interval said delayed amplified received spread spectrum signal, said delay circuit and said antenna being electrically connected and located within said repeater site; and wherein said step of receiving and said step of transmitting are mutually exclusive events.

2. The method of amplifying a spread spectrum signal of claim 1 wherein each symbol of said series of code symbols is one symbol duration in length and wherein said predetermined amount of delay is smaller than said symbol duration.

3. The method of amplifying a spread spectrum signal of claim 1 wherein said steps of receiving and transmitting are periodic with a period equal to approximately twice said predetermined amount of delay.

4. The method of amplifying a spread spectrum signal of claim 1 wherein said step of delaying is accomplished using a standing acoustic wave (SAW) filter.

5. The method of amplifying a spread spectrum signal of claim 1 wherein said steps of receiving, amplifying, delaying, and transmitting are performed at a first location remote from a source supplying said spread spectrum signal, further comprising the steps of:

receiving during a third interval at a second location said transmitted spread spectrum signal;

amplifying at said second location said received spread spectrum signal;

delaying at said second location said amplified received spread spectrum signal by a second predetermined amount; and transmitting at said second location during a fourth interval said delayed amplified received spread spectrum signal;

wherein said step of receiving and said step of transmitting at said second location are mutually exclusive events.

6. The method of amplifying a spread spectrum signal of claim 5 wherein said steps of receiving and transmitting at said second location are periodic with a period equal to approximately twice said second predetermined amount of delay and wherein said second predetermined amount of delay is at least twice as long as said predetermined amount of delay.

7. The method of amplifying a spread spectrum signal of claim 5 wherein said steps of receiving and transmitting at said second location are periodic with a period equal to approximately twice said second predetermined amount of delay and wherein said second predetermined amount of delay is less than half as long as said predetermined amount of delay.

8. The method of amplifying a spread spectrum signal of claim 5 wherein said step of delaying at said second location is performed by passing said amplified received spread spectrum signal through a standing acoustic wave (SAW) filter tuned to a center frequency of said spread spectrum signal.

9. The method of amplifying a spread spectrum signal of claim 1 further comprising the steps of:

receiving during a third interval a second spread spectrum signal;

amplifying said second received spread spectrum signal;

delaying said second amplified received spread spectrum signal by a second predetermined amount; and transmitting during a fourth interval said second delayed amplified received spread spectrum signal.

10. The method of amplifying a spread spectrum signal of claim 9 wherein said first interval and said third interval overlap in time.

11. The method of amplifying a spread spectrum signal of claim 9 wherein said first interval and said third interval correspond to the same time interval.

12. The method of amplifying a spread spectrum signal of claim 9 wherein said first interval and said fourth interval overlap in time.

13. The method of amplifying a spread spectrum signal of claim 9 wherein said first interval and said fourth interval correspond to the same time interval.

14. The method of amplifying a spread spectrum signal of claim 9 wherein said second predetermined amount is the same as said predetermined amount.

15. The method of amplifying a spread spectrum signal of claim 9 wherein said second predetermined amount is different from said predetermined amount.

16. The method of amplifying a spread spectrum signal of claim 1 wherein said series of code symbols is modulated with a pseudonoise (PN) sequence.

17. The method of amplifying a spread spectrum signal of claim 1 wherein said series of code symbols is frequency hopped over time.

18. The method of amplifying a spread spectrum signal of claim 1 wherein said step of delaying further comprising the steps of:

converting said amplified received spread spectrum signal to a digital signal;

delaying said converted digital signal using a digital storage device; and converting said delayed converted digital signal into an analog signal.

19. The method of amplifying a spread spectrum signal of claim 18 wherein said predetermined amount varies over time.

20. An apparatus for amplifying a spread spectrum signal comprising:

means for receiving intermittently said spread spectrum signal;

means for amplifying said received spread spectrum signal;

means for delaying said amplified received spread spectrum signal by a predetermined amount;

means for transmitting intermittently said delayed amplified received spread spectrum signal;

wherein said means for receiving intermittently and said means for transmitting intermittently operate mutually exclusively such that said delayed amplified received spread spectrum signal is transmitted only or said spread spectrum signal is received only;

wherein the apparatus for amplifying said spread spectrum signal further comprises:

means for receiving intermittently a second spread spectrum signal;

means for amplifying said second received spread spectrum signal;

means for delaying said second amplified received spread spectrum signal by a second predetermined amount;

means for transmitting intermittently said second delayed amplified received spread spectrum signal;

wherein the apparatus for amplifying said spread spectrum signal further comprises:

means for detecting a first gain of said intermittently transmitted spread spectrum signal; and means for adjusting a second gain in said step of amplifying said second received spread spectrum signal based on said first gain.

21. A time division duplex repeater for amplifying a spread spectrum signal comprising:

a first antenna receiving a forward link signal;

an amplifier coupled to said first antenna;

a delay device coupled in series with said first antenna and said amplifier;

a second antenna coupled in series with said first antenna, said amplifier and said delay device for providing a repeated forward link signal; and an isolation device coupled in series with said amplifier, said first and second antennas, and said delay device for intermittently breaking a connection of said forward link signal to said delay device while said repeated forward link signal is provided by said second antenna.

22. The time division duplex repeater for amplifying a spread spectrum signal of claim 21 wherein said first and second antennas are the same physical structure.

23. The time division duplex repeater for amplifying a spread spectrum signal of claim 21 wherein said first antenna is a directional antenna directed at a source of said forward link signal.

24. The time division duplex repeater for amplifying a spread spectrum signal of claim 21 wherein said first antenna and said second antenna are located some distance apart.

25. The time division duplex repeater for amplifying a spread spectrum signal of claim 21 wherein said delay device is a standing acoustic wave (SAW) filter.

26. The time division duplex repeater for amplifying a spread spectrum signal of claim 21 wherein said delay device comprises:
- an analog to digital converter;
- a digital storage device coupled to an output of said analog to digital converter; and
- a digital to analog converter coupled to an output of said digital storage device.

27. The time division duplex repeater for amplifying a spread spectrum signal of claim 21 further comprising:
- a third antenna receiving a reverse link signal;
- a reverse link amplifier coupled to said third antenna;
- a reverse link delay device coupled in series with said third antenna and said reverse link amplifier;
- a fourth antenna coupled in series with said third antenna, said reverse link amplifier and said reverse link delay device for providing a repeated reverse link signal; and
- a reverse link isolation device coupled in series with said reverse link amplifier, said third and fourth antennas, and said reverse link delay device for intermittently disrupting a connection of said reverse link signal to said reverse link delay device while said repeated reverse link signal is provided by said fourth antenna.

28. The time division duplex repeater for amplifying a spread spectrum signal of claim 27 wherein said first, second, third and fourth antennas are the same physical structure.

29. The time division duplex repeater for amplifying a spread spectrum signal of claim 27 wherein said third and fourth antennas are the same physical structure.

30. The time division duplex repeater for amplifying a spread spectrum signal of claim 27 wherein said first and third antennas are the same physical structure.

31. The time division duplex repeater for amplifying a spread spectrum signal of claim 27 wherein said first and third antennas are a single directional antenna.

32. The time division duplex repeater for amplifying a spread spectrum signal of claim 21 wherein said spread spectrum signal is modulated with a pseudonoise (PN) sequence.

33. The time division duplex repeater for amplifying a spread spectrum signal of claim 21 wherein said spread spectrum signal is frequency hopped over time.

34. A method of amplifying a spread spectrum signal, said spread spectrum signal comprised of a series of code symbols, said method comprising the steps of:
- receiving during a first interval said spread spectrum signal;
- amplifying said received spread spectrum signal;
- delaying said amplified received spread spectrum signal by a predetermined amount;
- transmitting during a second interval said delayed amplified received spread spectrum signal;
- wherein said step of receiving and said step of transmitting are mutually exclusive events and wherein the method of amplifying said spread spectrum signal further comprises the steps of:
- receiving during a third interval a second spread spectrum signal;
- amplifying said second received spread spectrum signal;
- delaying said second amplified received spread spectrum signal by a second predetermined amount;
- transmitting during a fourth interval said second delayed amplified received spread spectrum signal;
- wherein the method of amplifying said spread spectrum signal further comprises the steps of:
- detecting a first gain of said transmitted spread spectrum signal; and
- adjusting a second gain in said step of amplifying said second received spread spectrum signal based on said first gain.

35. A method of amplifying a spread spectrum signal, said spread spectrum signal comprised of a series of code symbols, said method comprising the steps of:
- receiving during a first interval said spread spectrum signal;
- amplifying said received spread spectrum signal;
- delaying said amplified received spread spectrum signal by a predetermined amount;
- transmitting during a second interval said delayed amplified received spread spectrum signal;
- wherein said step of receiving and said step of transmitting are mutually exclusive events and wherein the method of amplifying said spread spectrum signal further comprises the steps of:
- receiving during a third interval a second spread spectrum signal;
- amplifying said second received spread spectrum signal;
- delaying said second amplified received spread spectrum signal by a second predetermined amount;
- transmitting during a fourth interval said second delayed amplified received spread spectrum signal;
- wherein the method of amplifying a spread spectrum signal further comprises the steps of:
- transmitting a reverse link communication signal within said second spread spectrum signal;
- receiving and demodulating a forward link communication signal within said spread spectrum signal to determine a gain adjustment signal contained therein; and
- adjusting a gain in said step of amplifying said second received spread spectrum signal according to said gain adjustment signal.

36. An apparatus for amplifying a spread spectrum signal comprising:
- means for receiving intermittently said spread spectrum signal;
- means for amplifying said received spread spectrum signal;
- means for delaying said amplified received spread spectrum signal by a predetermined amount;
- means for transmitting intermittently said delayed amplified received spread spectrum signal;
- wherein said means for receiving intermittently and said means for transmitting intermittently operate mutually exclusively such that said delayed amplified received spread spectrum signal is transmitted only or said spread spectrum signal is received only;

wherein the apparatus for amplifying said spread spectrum signal further comprises:

means for receiving intermittently a second spread spectrum signal;

means for amplifying said second received spread spectrum signal;

means for delaying said second amplified received spread spectrum signal by a second predetermined amount;

means for transmitting intermittently said second delayed amplified received spread spectrum signal;

wherein the apparatus for amplifying said spread spectrum signal further comprises:

means for transmitting a reverse link communication signal within said second spread spectrum signal;

means for receiving and demodulating a forward link communication signal within said spread spectrum signal to determine a gain adjustment signal contained therein; and means for adjusting a gain in said step of amplifying said second received spread spectrum signal according to said gain adjustment signal.

37. A time division duplex repeater for amplifying a spread spectrum signal comprising:

a first antenna receiving a forward link signal;

an amplifier coupled to said first antenna;

a delay device coupled in series with said first antenna and said amplifier;

a second antenna coupled in series with said first antenna, said amplifier, and said delay device for providing a repeated forward link signal;

an isolation device coupled in series with said amplifier, said first and second antennas, and said delay device for intermittently disrupting a connection of said forward link signal to said delay device while said repeated forward link signal is provided by said second antenna;

wherein the time division duplex repeater for amplifying said spread spectrum signal further comprises:

a third antenna receiving a reverse link signal;

a reverse link amplifier coupled to said third antenna;

a reverse link delay device coupled in series with said third antenna and said reverse link amplifier;

a fourth antenna coupled in series with said third antenna, said reverse link amplifier and said reverse link delay device for providing a repeated reverse link signal;

a reverse link isolation device coupled in series with said reverse link amplifier, said third and fourth antennas, and said reverse link delay device for intermittently disrupting a connection of said reverse link signal to said reverse link delay device while said repeated reverse link signal is provided by said fourth antenna;

wherein the time division duplex repeater for amplifying said spread spectrum signal further comprises:

a variable gain amplifier in series with said reverse link isolation device, said reverse link amplifier, said third and fourth antennas, and said reverse link delay device and receiving a gain control signal; and a mobile unit providing a first communication signal within said reverse link signal and receiving a second communication signal from within said repeated forward link signal, and providing said gain control signal.

* * * * *